US005800932A

United States Patent [19]

Suzuki et al.

[11] Patent Number: 5,800,932

[45] Date of Patent: Sep. 1, 1998

[54] ELECTRIC CONTACT MATERIAL AND A MANUFACTURING METHOD THEREFOR

[75] Inventors: Satoshi Suzuki; Mitsuru Murakawa, both of Nikko, Japan

[73] Assignee: The Furukawa Electric Co., Ltd., Tokyo, Japan

[21] Appl. No.: 604,836

[22] Filed: Feb. 22, 1996

[30] Foreign Application Priority Data

Feb. 28, 1995 [JP] Japan ........ 7-039663

[51] Int. Cl.[6] ........ B32B 15/00; B32B 15/18; B22F 3/00; B22F 7/00

[52] U.S. Cl. ........ 428/615; 428/547; 428/548; 428/637; 428/673; 252/514

[58] Field of Search ........ 428/615, 637, 428/547, 548, 673; 252/514

[56] References Cited

U.S. PATENT DOCUMENTS

| | | | |
|---|---|---|---|
| 3,271,193 | 9/1966 | Boykin | 252/514 |
| 3,717,483 | 2/1973 | Miller | 252/514 |
| 3,922,236 | 11/1975 | Douglas et al. | 252/514 |
| 4,204,863 | 5/1980 | Schreiner | 252/514 |
| 4,479,892 | 10/1984 | Shibata | 252/514 |
| 5,171,643 | 12/1992 | Suzuki et al. | 428/671 |
| 5,258,052 | 11/1993 | Bevington | 252/514 |
| 5,338,618 | 8/1994 | Suzuki et al. | 428/614 |
| 5,415,944 | 5/1995 | Kazem-Goudarzi et al. | 428/548 |
| 5,422,190 | 6/1995 | Alexander | 428/552 |

FOREIGN PATENT DOCUMENTS 3-180436 8/1991 Japan .

*Primary Examiner*—Cathy F. Lam

*Attorney, Agent, or Firm*—Frishauf, Holtz, Goodman, Langer & Chick, P.C.

[57] ABSTRACT

Disclosed is an electric contact material which comprises a contact substrate and a coating layer formed integrally on the surface of the contact substrate. The coating layer is formed of an Ag-Li-La alloy containing Au or/and Pd, and has a surface layer portion formed as a concentration gradient layer whose Au or/and Pd content decreases as a subsurface portion is approached. The Au or/and Pd concentration of the surface of the surface layer portion ranges from 50 to 95% by weight. The contact material is manufactured by forming an Au or/and Pd layer on the Ag-Li-La alloy and then heat-treating the whole resulting structure, thereby thermally diffusing the Au or/and Pd. This electric contact material has excellent corrosion resistance and lubricity, and its contact resistance changes little with time.

11 Claims, 1 Drawing Sheet

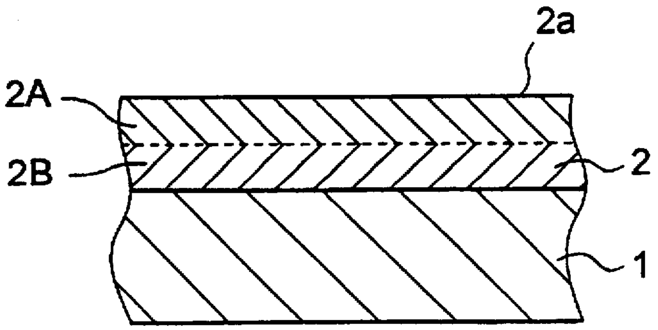
2a
2A
2B
2
1

ELECTRIC CONTACT MATERIAL AND A MANUFACTURING METHOD THEREFOR

BACKGROUND OF THE INVENTION

1. Field of the Invention

The present invention relates to an electric contact material and a manufacturing method therefor, and more specifically, to an electric contact material, which has excellent corrosion resistance and lubricity and is free from cohesion particularly in the initial stage of operation, and whose contact resistance changes little with time. The contact material can thus be used as a good material for sliding contacts incorporated in electric and electronic devices, such as miniature slide switches and motors, which operate in a low-current area, and a method for manufacturing the contact material.

2. Description of the Related Art

Conventionally, Ag-Cu alloys containing 1 to 20% of Cu by weight on Ag-Ni alloys containing 1 to 20% of Ni by weight are widely used as electric contact materials for on-off contacts incorporated in rivets, breakers, etc., sliding contacts in slide switches and the like, and rotary sliding contacts attached to motors and the like, for example.

These materials are not, however, satisfactory in arc resistance and wear resistance. In the cases of the Ag-Cu alloys, in particular, the contact resistance is increased and made unstable with time by Cu oxides that are formed during use. In the case where a sliding contact is formed from an Ag-Cu alloy and used as a peripheral contact piece of a commutator of a miniature motor, for example, therefore, the contact resistance changes with time, so that the rotating speed of the commutator varies substantially and becomes unstable. In the processes of transportation and storage of the manufactured electric contact materials before use, the surfaces of the contact materials may possibly corrode so that their contact resistance inevitably increases in the initial stage of operation.

In order to solve these problems, the inventors hereof proposed an Ag-Li-rare earth element alloy as an electric contact material which is satisfactory in arc resistance and wear resistance, and whose contact resistance is low and less susceptible to environment (Jpn. Pat. Appln. KOKAI Publication No. 3-180436).

The aforesaid various electric and electronic devices nowadays positively require higher performance and reliability, as well as an additional reduction in size. Also, these devices should be put in various working environments, sometimes involving very small quantities of organic gas atmospheres, such as ammonia, formalin, etc., or hot and humid atmospheres. Moreover, the electric contact materials may undergo changes of properties in the environments in processes from manufacture to use. These changes of properties of the unused contact materials may possibly take place also during prolonged transportation in a ship or the like, caused by contamination with chlorides, sulfides, oxides, etc.

These circumstances require the following properties of electric contacts which are incorporated in the devices.

First, the miniaturization of the devices requires a reduction in size of the incorporated electric contacts. Accordingly, the working current and contact load are very likely to be lowered. For example, many miniature devices are often used in conditions including the current of 1 to 10 mA and load of 49 mN or less. If the working current and contact load are thus low, the contact portion is liable to conduction failure. To avoid this, the contact resistance of the contact material used should be lowered.

In the case of a rotary sliding contact incorporated in, for example, a micromotor, moreover, variations in rotating speed during operation can be restrained only on condition that the contact resistance cannot easily change with time. When operating the motor in an organic gas atmosphere, such as ammonia, or a hot and humid atmosphere, in particular, the contact resistance is not expected to change with time after prolonged use. Thus, the contact materials positively require good corrosion resistance, such as the resistance to oxidation, sulfuration, ammonia, or organic gases.

There is a growing tendency for modern micromotors to be operated at a high speed of 5,000 to 20,000 rpm or thereabout. To ensure such high-speed operation, rotary sliding contacts to be incorporated in the motors must be formed of low-friction or high-lubricity materials. In the case of a motor which is operated in conditions including an infinitesimal current, low contact load, and high rotating speed, in particular, the torque is relatively small, so that the frictional resistance in a live state is very influential. In consequence, lowering the coefficient of friction may be the most important problem to be solved.

OBJECTS AND SUMMARY OF THE INVENTION

An object of the present invention is to provide an electric contact material, which has excellent corrosion resistance and lubricity and is reluctant to initial-stage cohesion, and whose contact resistance changes little with time, and a manufacturing method therefor.

Another object of the invention is to provide an electric contact material, adapted for use in a miniature electric or electronic device which operates in conditions including an infinitesimal current and low contact load, and a manufacturing method therefor.

In order to achieve the above objects, according to the present invention, there is provided an electric contact material which comprises a contact substrate and a coating layer formed integrally on the surface of the contact substrate, the coating layer being formed of an Ag-Li-La alloy containing Au or/and Pd and having a surface layer portion formed as a concentration gradient layer whose Au or/and Pd content decreases as a subsurface portion is approached, the Au or/and Pd concentration of the surface of the surface layer portion ranging from 50 to 95% by weight.

According to the invention, moreover, there is provided a manufacturing method for an electric contact material, which comprises steps of forming a layer of an Ag-Li-La alloy on the surface of a contact substrate, forming a layer of Au or/and Pd on the surface of the Ag-Li-La alloy layer, and heat-treating the whole resulting structure.

According to the invention, furthermore, there is provided a manufacturing method for an electric contact material, which comprises steps of forming a layer of Au or/and Pd on the surface of a member composed of an Ag-Li-La alloy, heat-treating the whole resulting structure, and integrally forming the treated structure on the surface of a contact substrate.

BRIEF DESCRIPTION OF THE DRAWING

The FIGURE is a sectional view showing a profile of an electric contact material according to the present invention.

DETAILED DESCRIPTION OF THE INVENTION

As shown in the sectional view of the FIGURE, an electric contact material according to the present invention is composed of a contact substrate 1 and a coating layer 2 (mentioned later) formed covering the surface of the substrate 1.

The material of the contact substrate 1 is not subject to any special restrictions, and may be any of the materials which have conventionally been used as contact substrate materials. These materials include, for example, copper such as tough pitch copper or oxygen-free copper, copper alloys, such as brass, phosphor bronze, nickel silver, beryllium copper, etc., iron, and iron alloys such as 42 alloy.

The coating layer 2 is formed of a material which contains an Ag-Li-La alloy and Au or/and Pd, and roughly comprises a surface layer portion 2A and a subsurface portion 2B. Au or/and Pd are contained in the surface layer portion 2A in the manner mentioned later, and the underlying subsurface portion 2B is composed virtually of the Ag-Li-La alloy only, without containing Au or/and Pd. In other words, the coating layer 2 is composed of the Ag-Li-La alloy as a general base metal, and the surface layer portion 2A is composed of a material which contains Au or/and Pd in the Ag-Li-La alloy as a base metal.

In the Ag-Li-La alloy which forms the base metal of the coating layer 2, Ag serves as a balancing component, Li as a component which is conductive to the improvement of the lubricity and arc resistance of the alloy, and La as a component which adds to the hardness of the alloy, thereby improving the wear resistance. If the percentage composition of either Li or La is lower than 0.01% by weight, the aforesaid properties of the alloy are unsatisfactory. If the Li percentage is higher than 2.0% by weight or if the La percentage is higher than 0.2% by weight, on the other hand, the specific resistance of the resulting alloy increases, and the contact resistance undergoes a substantial change with time. Thus, the properties of the resulting contact material, especially as a material for a sliding contact used in a low-current area, are lowered. Preferably, therefore, the Li and La percentages in the Ag-Li-La alloy as the base metal range from 0.01 to 2.0% and from 0.01 to 0.2% by weight, respectively, more preferably from 0.01 to 0.1% and from 0.02 to 0.2% by weight, respectively, and most preferably from 0.02 to 0.1% and from 0.05 to 0.2% by weight, respectively.

In the surface layer portion 2A, the Ag-Li-La alloy contains Au or/and Pd. Au or/and Pd have excellent corrosion resistance and lubricity themselves. In the case of the surface layer portion 2A, therefore, the effects of Au or/and Pd conducive to corrosion resistance and lubricity are added to the effects of Li conducive to lubricity and arc resistance and the effect of La conducive to wear resistance. Thus, the coating layer 2, as a whole, is higher in corrosion resistance, lubricity, and arc resistance than one whose surface layer portion is composed of the Ag-Li-La alloy only.

The surface layer portion 2A is manufactured by the method mentioned later. In consequence, it has a concentration gradient such that its surface *2a* (see the FIGURE) contains Au or/and Pd in plenty and the Au or/and Pd content decreases as the subsurface portion 2B is approached.

Having the surface layer portion 2A thus formed as a concentration gradient layer, the contact material according to the present invention exhibits excellent corrosion resistance and lubricity, as mentioned before, and also displays outstanding sliding properties from the initial stage, since cohesion can be effectively restrained in the initial stage.

In general, a true contact area between a head and the contact material is small in the initial stage of a sliding. Therefore, an actual contact load is much higher than an apparent contact load (contact load/sectional area of head), so that cohesive abrasion can easily occur. If cohesion is caused in the initial stage of the sliding, the friction coefficient is kept at a high value thereafter. If no cohesion is caused in the initial stage, a drape develops between the head and the contact material at the sliding portion (that is, the true contact area is increased), the friction coefficient is stabilized at a low value, and this state lasts.

In the case of the material of the present invention, the surface *2a* of the surface layer portion 2A contains Au or/and Pd at a maximum level. Accordingly, the material exhibits the highest corrosion resistance, lubricity, and arc resistance in its behavior in the initial stage of the sliding. Thus, a good drape can be enjoyed between the contact material and the head without involving hardly any cohesion, and the friction coefficient is stabilized at a low value. Since the surface layer portion 2A is the concentration gradient layer of Au or/and Pd, the effects of Au or/and Pd last, though not so good as those of the surface *2a*, despite the advance of its wear caused by prolonged contact operation. Even in case the surface layer portion 2A is finally worn out so that the head is brought directly into contact with the subsurface portion 2B (Ag-Li-La alloy only), therefore, the coefficient of friction between the head and the contact material can be kept at a low value, since the drape is already yielded between them by that time. Thus, the concentration gradient layer of Au or/and Pd, which constitutes the surface layer portion 2A, enables the contact material of the invention to display its outstanding sliding properties from the start. In other words, the surface layer portion 2A serves to prevent cohesion in the initial stage, thereby improving the sliding properties of the contact material, and to convey this state to the subsurface portion 2B thereunder.

Thus, the aforesaid effects of the surface layer portion 2A are based on the Au or/and Pd content of the surface *2a* as a basic controling factor. According to the present invention, the Au or/and Pd of the surface *2a* is restricted to 50 to 95% by weight (so that the percentage composition of the Ag-Li-La alloy ranges from 5 to 50% by weight) for the following reasons.

If the Au or/and Pd content of the surface *2a* is lower than 50% by weight, the surface layer portion 2A and hence the whole coating layer 2 are low in corrosion resistance. In the case of a coil motor, for example, its rotating speed varies due to increase in contact resistance. If the Au or/and Pd content is higher than 95% by weight, on the other hand, the surface layer portion 2A and hence the whole coating layer 2 are low in lubricity, and the motor torque is lowered as the friction coefficient increases. Preferably, the Au or/and Pd content ranges from 70 to 95% by weight, further preferably from 70 to 90% by weight.

Basically, the aforementioned effects of the surface layer portion 2A are determined by the Au or/and Pd contained in the surface *2a*, so that the influence of the thickness of the layer portion 2A is a secondary factor. If the layer portion 2A is too thin, however, the environmental resistance (corrosion resistance) is poor. If the surface layer portion 2A is too thick, on the other hand, Au or/and Pd, which are used in the manufacturing method mentioned later and are expensive, are increased in usage, thus lowering the economical efficiency. Preferably, therefore, the thickness of the layer portion 2A ranges from 0.1 to 5.0 μm, further preferably from 0.5 to 2.0 μm.

The contact material of the present invention can be manufactured in the following manner.

First, an Ag-Li-La alloy layer with a predetermined thickness is formed on the surface of a given contact material by, for example, cladding. This layer thickness, which is not subject to any special restrictions, normally ranges from 10 to 100 μm.

Then, an Au or/and Pd layer with a predetermined thickness is formed on the surface of the Ag-Li-La alloy layer. Normally, this is done by electroplating.

Thereafter, the whole resulting structure is subjected to heat treatment.

In this process of treatment, Au or/and Pd, which constitute the outermost layer, diffuse to a certain depth in the Ag-Li-La alloy layer, whereupon the Ag-Li- La alloy layer is converted into a composite layer which includes the surface layer portion 2A as a concentration gradient layer of Au or/and Pd and the underlying subsurface portion 2B which is composed only of the Ag-Li-La alloy.

Preferably, this heat treatment is conducted at a temperature of 300° to 800° C. for 0.2 to 30 minutes. If the treatment temperature is too high, the materials which constitute the contact substrate and the coating layer are liable to meet, so that thermal diffusion of Au or/and Pd is out of the question. If the treatment temperature is too low, Au or/and Pd fail to undergo thermal diffusion. If the treatment time is too long, moreover, thermal diffusion of Au or/and Pd advances so far that the Au or/and Pd content of the surface *2a* of the formed surface layer portion 2A becomes lower than 50% by weight. If the treatment time is too short, on the other hand, thermal diffusion of Au or/and Pd into the Ag-Li-La alloy layer makes no progress, the Au or/and Pd content of the surface *2a* inevitably exceeds 95% by weight.

If the resulting contact material is rolled or drawn after this heat treatment is finished, it becomes harder as a whole, and its sliding properties are improved.

The contact material of the present invention may be also manufactured in the following manner. First, the Au or/and Pd layer is formed on the surface of a member such as a strip of the Ag-Li-La alloy in the same manner as aforesaid. Then, the resulting structure is heat-treated in the conditions mentioned before, and the contact substrate is clad entirely or partially with the treated strip material (member) or the strip material is riveted for integration.

EXAMPLES 1 TO 10 & COMPARATIVE EXAMPLES 1 TO 6

Various Ag alloys shown in Table 1 were prepared in a high-frequency blast furnace, and the resulting ingots were rolled into strips having the thickness of 0.3 mm (300 μm). Then, layers of Au or/and Pd with the thicknesses shown in Table 1 were formed on the one side of the strips by electroplating, and were heat-treated in the conditions shown in Table 1. All the resulting strips except Example 5 were further rolled to an overall thickness of 0.2 mm (or 200 μm).

The strips thus obtained were measured for the surface layer thickness and concentration gradient as follows. Table 1 shows the results of these measurements.

Surface layer thickness (μm): The cross sections of the strips were observed and measured by elemental analysis using an X-ray microanalyzer.

Au or Pd concentration gradient of surface layer portion: The Au or Pd content of the surface of the surface layer portion was analyzed by means of the X-ray microanalyzer.

Thereafter, the subsurface 1 μm deep below the surface was exposed, and the Au or Pd content of the exposed subsurface was analyzed by means of the same microanalyzer.

Then, a contact substrate of oxygen-free copper with a thickness of 0.5 mm (or 500 μm) was clad with each strip, whereupon a contact material was obtained.

The contact materials thus obtained were measured for the contact resistance after a slide abrasion contact resistance test (fretting test), live-state dynamic friction coefficient obtained with use of a high-speed rotary slide tester, and change of contact corrosion resistance based on an atmospheric heating test and sulfuration test as follows. Table 1 shows the results of these measurements.

Slide Abrasion Contact Resistance Test (Fretting Test)

Head: Ag-50% Pd rod having head portion of 1-mm radius.

Load: 49 mN.

Conduction current: 1.0 A.

Sliding distance: 0.1 mm.

Sliding frequency: 200,000 strokes.

Sliding speed: 100 Hz.

Contact resistance (Rc: mΩ) between each of contact materials and the head was measured after 200,000 strokes of head sliding.

High-speed Rotary Slide Test

Head: Ag-50% Pd rod having head portion of 1-mm radius.

Load: 49 mN.

Conduction current: 0.05 A.

Sliding radius: 2 mm.

Sliding frequency: 1,000,000 strokes.

Rotating speed: 2,000 rpm.

Dynamic friction coefficient (μk) was measured after 1,000, 10,000, 100,000, and 1,000,000 strokes of sliding.

Atmospheric heating test: The contact materials were heated in the atmosphere of 150° C. for 100 hours, and the contact resistance (mΩ) was measured in conditions including the load of 49 mN and conduction current of 0.1 A before and after the test.

Sulfuration test: The contact materials were left to stand for 8 hours in an ambience containing 3 ppm of hydrogen sulfide at the temperature of 40° C. and relative humidity of 80%, and the contact resistance (mΩ) was measured in conditions including the load of 49 mN and current of 0.1 A before and after the test.

TABLE 1-1

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| Composition of | Li | 0.1 | 0.1 | 0.1 | 0.1 | 0.1 | 0.1 | 0.1 | 0.1 | 0.1 | 0.1 |
| Strip Material | La | 0.1 | 0.1 | 0.1 | 0.1 | 0.1 | 0.1 | 0.1 | 0.1 | 0.1 | 0.1 |
| (% by weight) | Others | — | — | — | — | — | — | — | — | — | — |
| | Ag | bal | bal | bal | bal | bal | bal | bal | bal | bal | bal |

TABLE 1-1-continued

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| Plated Layer | Material | Au | Au | Au | Au | Au | Au | Pd | Au-50Pd | Au | Au |
| | Thickness (μm) | 1.0 | 1.0 | 1.0 | 1.0 | 1.0 | 1.0 | 1.0 | 1.0 | 0.1 | 0.5 |
| Heat | Temperature (°C.) | 600 | 600 | 600 | 600 | 600 | 600 | 600 | 600 | 600 | 600 |
| Treatment | Time (minutes) | 5 | 3 | 7 | 10 | 5 | 5 | 5 | 5 | 0.5 | 3 |
| Surface | Thickness (μm) | 2 | 1.5 | 3 | 4 | 2 | 2 | 2 | 2 | 0.3 | 1.2 |
| Layer Portion | Au(Pd) Content of Surface (% by wt.) | 70 | 85 | 60 | 50 | 70 | 70 | 70 | 70 | 60 | 50 |
| | Content in Depth of 1 μm (% by wt.) | 50 | 70 | 40 | 30 | 50 | 50 | 50 | 50 | 0 | 20 |
| Fretting Test Results (Rc: mΩ) | | 4 | 6 | 4 | 4 | 4 | 3 | 6 | 4 | 5 | 4 |
| Dynamic | After 1,000 Strokes | 0.15 | 0.20 | 0.14 | 0.13 | 0.16 | 0.13 | 0.20 | 0.18 | 0.13 | 0.14 |
| Friction | After 10,000 Strokes | 0.17 | 0.20 | 0.14 | 0.13 | 0.17 | 0.15 | 0.20 | 0.18 | 0.14 | 0.14 |
| Coeffici- | After 100,000 Strokes | 0.17 | 0.21 | 0.15 | 0.13 | 0.17 | 0.15 | 0.19 | 0.17 | 0.17 | 0.15 |
| ent (μk) | After 1,000,000 Strokes | 0.18 | 0.21 | 0.15 | 0.13 | 0.17 | 0.15 | 0.19 | 0.18 | 0.18 | 0.16 |
| Heat/ | Before Test | 3 | 3 | 3 | 3 | 3 | 3 | 3 | 3 | 3 | 3 |
| Corrosion Resistance | After Atmospheric Heating Test | 4 | 5 | 4 | 3 | 3 | 3 | 4 | 4 | 4 | 4 |
| (Rc: mΩ) | After Sulfuration Test | 4 | 3 | 8 | 10 | 4 | 4 | 4 | 4 | 10 | 10 |

TABLE 1-2

| | | Comparative Example No. | | | | | |
|---|---|---|---|---|---|---|---|
| | | 1 | 2 | 3 | 4 | 5 | 6 |
| Composition of | Li | 0.1 | 0.1 | 0.1 | Ag | 0.1 | 0.1 |
| Strip Material | La | 0.1 | 0.1 | 0.1 | Alone | 0.1 | 0.1 |
| (% by weight) | Others | — | — | — | | Cu: 10 | Cu: 10 |
| | Ag | bal | bal | bal | | bal | bal |
| Plated Layer | Material | Au | Au | — | — | — | Au |
| | Thickness (μm) | 1.0 | 1.0 | — | — | — | 1.0 |
| Heat | Temperature (°C.) | 600 | 600 | — | — | — | 600 |
| Treatment | Time (minutes) | 1 | 15 | — | — | — | 5 |
| Surface | Thickness (μm) | 1.2 | 6 | — | — | — | 2 |
| Layer Portion | Au(Pd) Content of Surface (% by wt.) | 100 | 40 | — | — | — | 70 |
| | Content in Depth of 1 μm (% by wt.) | 90 | 30 | — | — | — | 50 |
| Fretting Test Results (Rc: mΩ) | | 4 | 7 | 38 | 10 | 25 | 9 |
| Dynamic | After 1,000 Strokes | 0.85 | 0.26 | 1.15 | 0.30 | 0.75 | 0.23 |
| Friction | After 10,000 Strokes | 0.80 | 0.28 | 1.21 | 0.31 | 0.80 | 0.22 |
| Coeffici- | After 100,000 Strokes | 0.82 | 0.30 | 1.32 | 0.32 | 0.85 | 0.23 |
| ent (μk) | After 1,000,000 Strokes | 0.83 | 0.30 | 1.35 | 0.35 | 0.87 | 0.24 |
| Heat/ | Before Test | 3 | 3 | 3 | 3 | 4 | 3 |
| Corrosion Resistance | After Atmospheric Heating Test | 3 | 4 | 3 | 6 | 25 | 4 |
| (Rc: mΩ) | After Sulfuration Test | 3 | 20 | 120 | 45 | 180 | 4 |

Table 1 indicates the following facts or effects.

(1) As seen from comparison between the individual Examples and Comparative Example 3, the Rc value obtained after the sulfuration test considerably varies depending on the presence of the Au layer on the surface, despite the sameness in composition of the strip materials used. Thus, the corrosion resistance can be improved very effectively by forming a concentration gradient of Au in the surface layer portion, as in the case of the coating layer of the present invention.

(2) As seen from comparison between Example 1 and Comparative Example 6, the fretting test result and lubricity are poor unless the Ag alloy as the base metal is the Ag-Li-La alloy (Cu percentage composition: 10% by weight), even though the coating layer has an Au concentration gradient similar to that of the coating layer of the present invention.

(3) Any of the contact materials (Examples 1 to 10) according to the invention exhibits a low dynamic friction coefficient during high-speed sliding motion, small changes with time, and very high lubricity after 1,000,000 revolutions.

(4) In the case where the Au content of the surface of the formed surface layer portion is 100% by weight (Comparative Example 1), the dynamic friction coefficient during high-speed sliding motion is low, although the corrosion resistance is good. In the case where the Au content of the surface is 40% by weight (Comparative Example 2), both the results of the fretting test and the high-speed slide test are poor, and the corrosion resistance is extremely poor.

These results indicate that the Au (Pd) content of the surface of the surface layer portion should be adjusted to 50 to 95% by weight.

What is claimed is:

1. An electric slide contact material comprising:

a contact substrate having an upper surface and a lower surface; and a coating layer formed integrally on the upper surface of the contact substrate, the coating layer being formed of an Ag-Li-La alloy containing at least one of Au and Pd, the coating layer comprising (i) a surface layer portion having a thickness of from 0.5 to 2 μm and being formed as a concentration gradient layer and having an upper surface and a lower surface and (ii) a subsurface layer portion which substantially contains the Ag-Li-La alloy and which is disposed between the upper surface of the contact substrate and the lower surface of the surface layer portion, wherein the content of the at least one of Au and Pd decreases as the subsurface layer portion is approached, and the concentration of at least one of Au and Pd on the upper surface of the surface layer portion is from 50 to 95% by weight.

2. An electric slide contact material according to claim 1, which forms a contact piece of a commutator of a micro-motor.

3. An electric slide contact material according to claim 1, wherein said Ag-Li-La alloy contains from 0.01 to 2.0 wt. % Li and from 0.01 to 0.2 wt. % La.

4. An electric slide contact material according to claim 1, wherein said Ag-Li-La alloy contains from 0.01 to 0.1 wt. % Li and from 0.02 to 0.2 wt. % La.

5. An electric slide contact material according to claim 1, wherein said Ag-Li-La alloy contains from 0.02 to 0.1 wt. % Li and from 0.05 to 0.2 wt. % La.

6. An electric slide contact material according to claim 5, wherein said coating layer is formed of an Ag-Li-La alloy containing Au.

7. An electric slide contact material according to claim 6, wherein said Ag-Li-La alloy contains 0.1 wt. % Li and 0.1 wt. % La.

8. An electric slide contact material according to claim 3, wherein said at least one of Au and Pd concentration of the surface of the surface layer portion ranges from 70 to 95% by weight.

9. An electric slide contact material according to claim 1, wherein said concentration of the at least one of Au and Pd on the surface of the surface layer portion is from 70 to 90% by weight.

10. An electric slide contact material according to claim 3, wherein the ratio of thickness of said surface layer portion to said Ag-Li-La alloy subsurface portion of said coating layer is from 1/3000 to 1/300.

11. An electric slide contact material according to claim 9, wherein the ratio of thickness of said surface layer portion to said Ag-Li-La alloy subsurface portion of said coating layer is from 1/3000 to 1/300.

* * * * *